United States Patent [19]

Gottfried

[11] Patent Number: 4,773,053
[45] Date of Patent: Sep. 20, 1988

[54] OPTICAL SYSTEM FOR GUIDING THE READ BEAM IN A MAGNETO-OPTICAL STORAGE

[75] Inventor: Norbert Gottfried, Baldham, Fed. Rep. of Germany

[73] Assignee: Siemens Aktiengesellschaft, Berlin & Munich, Fed. Rep. of Germany

[21] Appl. No.: 866,967

[22] Filed: May 27, 1986

[30] Foreign Application Priority Data

May 31, 1985 [DE] Fed. Rep. of Germany ....... 3519556

[51] Int. Cl.$^4$ ............................................. G11B 7/095
[52] U.S. Cl. ....................................... 369/45; 369/44; 369/46; 369/110; 369/120; 369/13; 250/201; 250/202
[58] Field of Search ...................... 369/44, 45, 46, 110, 369/120, 13; 250/201, 202

[56] References Cited

U.S. PATENT DOCUMENTS

| | | | |
|---|---|---|---|
| 3,228,015 | 1/1966 | Miyata et al. ........................ | 360/114 |
| 4,410,277 | 10/1983 | Yamamoto et al. ................. | 356/366 |
| 4,451,863 | 5/1984 | Yanagida ............................. | 369/46 |
| 4,546,460 | 10/1985 | Ondo .................................... | 369/120 |
| 4,546,463 | 10/1985 | Opheij .................................. | 369/110 |
| 4,558,440 | 12/1985 | Tomita ................................. | 369/110 |
| 4,617,654 | 10/1986 | Gross .................................... | 369/46 |
| 4,626,679 | 12/1986 | Kuwayama ......................... | 369/45 |
| 4,654,839 | 3/1987 | Endo .................................... | 369/46 |

FOREIGN PATENT DOCUMENTS

| | | |
|---|---|---|
| 3334120 | 3/1984 | Fed. Rep. of Germany . |
| 2149654 | 3/1973 | France . |
| WO85/1606 | 4/1985 | PCT Int'l Appl. . |

OTHER PUBLICATIONS

Y. Togami et al., "Amorphous GdCo Disk for Thermomagnetic Recording", *J. Appl. Phys.*, vol. 53, No. 3, Mar. 1982, pp. 2335-2337.
Y. Nagao et al., "Dynamic Recording and Readout Characteristics of GdTbFe Using a Modified Magneto-Optical Disk Exerciser", *Japanese Journal of Applied Physics*, vol. 21, No. 8, Aug. 1982, pp. L509-L511.
N. Imamura et al., "Experimental Study on Magneto-Optical Disk Exerciser with the Laser Diode and Amorphous Magnetic Thin Films", *Japanese Journal of Applied Physics*, vol. 19, No. 12, Dec. 1980, pp. L731-L734.
Beck, "Electro-Optical Reading System", *IBM Technical Disclosure Bulletin*, vol. 10, No. 5, Oct. 1967, p. 596.
*Patent Abstracts of Japan*, vol. 9, No. 24 (P331)(1747) Jan. 31, 1985 of Japanese Patent 59-168955(A), Sep. 22, 1984, Kenji Torasawa (Sanyo Denki K.K.).
*Patent Abstracts of Japan*, vol. 8, No. 192 (P298)(1629) Sep. 4, 1984 of Japanese Patent 59-79446(A), Apr. 8, 1984, Toshihisa Deguchi (Sharp K.K.).
*Patent Abstracts of Japan*, vol. 8, No. 208 (P-302)(1645) Sep. 21, 1984 of Japanese Patent 59-92457(A), May 28, 1984, Tooru Nakamura (Matsushita Denki Sangyo K.K.).

(List continued on next page.)

*Primary Examiner*—Alan Faber
*Attorney, Agent, or Firm*—Hill, Van Santen, Steadman & Simpson

[57] ABSTRACT

An optical system for guiding a read beam and a magneto-optical storage which utilizes a single beam splitter inserted in the beam path of a linearly polarized light beam directed onto a storage disk for splitting the reflected beam into a deflected beam path and onto photo detectors. This optical arrangement includes a polarizer and an astigmatic imaging system. One of the two photo detectors is a four-quadrant detector and the other of the two detectors can be split into two regions with each of these detectors being positioned in one of the two sub-beams. Data signals derived from the intensity differences between the sub-beams and control signals for both a focusing control and for tracking control are derived from the detectors. Preferably, the photo detectors and the integrated circuits are part of an integrated circuit which also includes electrical circuits for the arrangements for obtaining the raw data, the tracking signal and the focusing signal.

17 Claims, 3 Drawing Sheets

OTHER PUBLICATIONS

*Patent Abstracts of Japan*, vol. 8, No. 188 (P-297)(1625) Aug. 29, 1984 of Japanese Patent 59-77649(A), May 4, 1984, Masahiro Higuchi (Sanyo Denki K.K.).

*Patent Abstracts of Japan*, vol. 9, No. 72 (P-345)(1795) Apr. 2, 1985 of Japanese Patent 59-203259(A), Nov. 17, 1984, Youichi Tsuchiya (Sanyo Denki K.K.).

*Patent Abstracts of Japan*, vol. 9, No. 54 (P-340)(1777), Mar. 8, 1985 of Japanese Patent 59-191156(A), Oct. 30, 1984, Kiyoshi Kimoto (Nihon Kougaku Kogyo K.K.).

*Patent Abstracts of Japan*, vol. 6, No. 116 (P-125)(994) Jun. 29, 1982 of Japanese Patent 57-44241(A), Mar. 12, 1982, Masahiro Orukawa (Matsushita Denki Sangyo KK).

*Patent Abstracts of Japan*, vol. 9, No. 24 (P-331)(1747) Jan. 31, 1985 of Japanese Patent 59-168951, Sep. 22, 1984, Kenji Torasawa (Sanyo Denki K.K.).

*Patent Abstracts of Japan*, vol. 7, No. 15 (P169)(1160) Jan. 21, 1983 of Japanese Patent 57-169947(A), Oct. 19, 1982, Akira Takahashi (Sharp K.K.).

*Patent Abstracts of Japan*, vol. 9, No. 2 (P-325)(1725) Jan. 8, 1985 of Japanese Patent 59-152531(A), Aug. 31, 1984, Tooru Nakamura (Matsushita Denki Sangyo KK).

*Patent Abstracts of Japan*, vol. 8, No. 1 (P-246)(1438) Jan. 6, 1984 of Japanese Patent 58-166542(A), Oct. 1, 1983, Noriya Kaneda (Hitachi Seisakusho K.K.).

*Patent Abstracts of Japan*, vol. 9, No. 30 (P-333)(1753) Feb. 8, 1985 of Japanese Patent 59-172171(A), Sep. 28, 1984, Mikio Sugiki (Sony K.K.).

OPTICAL SYSTEM FOR GUIDING THE READ BEAM IN A MAGNETO-OPTICAL STORAGE

BACKGROUND OF THE INVENTION

The invention is directed to an optical system for guiding a read or sensing beam in a magneto-optical storage system. In particular, the optical system has means for creating a polarized read beam and directing it on the storage medium which creates a reflected beam and a beam splitter which is positioned in the path of the reflected beam to deflect the reflected beam from the path of the read beam as a deflected beam. The system includes detector means which are connected to first means for creating a focusing control signal, second means for creating a tracking control signal, and third means for generating a raw data signal, and optical means for directing the deflected beam onto the deflector means.

In a magneto-optical storage system, as known, a light beam emitted from a laser light source is focused onto a selected track of a rotating storage disk. This is true both for the writing operation as well as for the reading operation. The only difference, among other things, is that a higher light intensity is used during the writing operation than during the reading operation. A typical property of a magneto-optical storage is that two control signals for exacting the position of the optical system relative to the storage medium must also be derived from a reflected laser light beam, which is split from the beam path of the sensing light beam. This beam, which is split from the path, is utilized in addition, to determine the raw data signals from the reading and to create the two control signals. First the laser light beam must be guided into a defined position radially relative to the storage disk and must be held there. This is accomplished in a known way by a control system for the track selection and for track following. Secondly, the laser light beam must be focused onto a storage region within such a track at every point in time and a second control system is utilized, which is referred to as focusing system for maintaining a predetermined vertical distance between the surface of the storage disk and the optical system.

Figure 1:
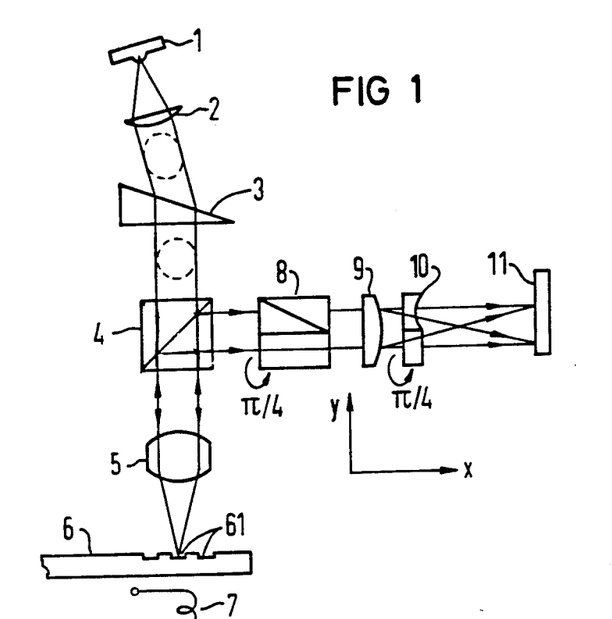
FIG. 1 is a block circuit diagram of a fundamental structure of an optical scanning system for a magneto-optical storage in accordance with the present invention.

Optical systems for guiding the read beam, which fulfill these jobs are known. An example is disclosed in an article by Y. Togami et al "Amorphous GdCo disk for thermomagnetic recording", *Journal of Applied Physics*, Volume 53, No. 3, March 1982, pp. 2335-2337. Another example of a known system is disclosed in an article by Y. Nagao et al "Dyanamic Recording and Readout Characteristics of GdTbFe Using a Modified Magneto-Optical Disk Exerciser", *Japanese Journal of Applied Physics*, Volume 21, No. 8, August 1982, pp. L509-L511. A third example is disclosed by N. Imamura et al "Experimental Study on Magneto-Optical Disk Exerciser With the Laser Diode in Amorphus Magnetic Thin Films", *Japanese Journal of Applied Physics*, Volume 19, No. 11, December 1980, pp. L731-L734. FIG. 1 in each of these three articles respectively shows a block circuit diagram for a magneto-optical storage and an optical beam path in the scanning system. What these arrangements have in common is that the reflected laser beam is repeatedly split by beam splitters and these sub-beams are then imaged onto spatially separated photo detector surfaces. Raw data signals or respectively control signals for both focusing systems and track following systems are acquired from the electrical output signals emitted by the individual photo detector surfaces. This multiple beam splitting has the disadvantages of increasing the cost but also has a disadvantage because the scanning unit to be positioned in two directions with respect to the storage disk has a relatively great mass because of the multitude of optical elements and therefore, is more mechanically sluggish.

Figure 2:
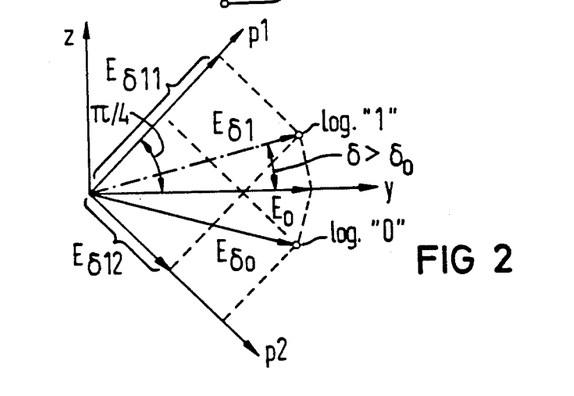
FIG. 2 is a vector diagram for the beam division of the reflected laser beam in a polarizer.

Over and above this, the two essential forms for the acquisition of the control signal of the focusing system which are usually referred to as astigmatic imaging principle or respectively as the principle of the critical angle may also be obtained from the last two of these three articles. In the article by N. Imamura et al, FIG. 2 illustrates an imaging error of a cylindrical lens which is employed in conjunction with a four-quadrant photo detector in order to identify a focusing error. The article by Y. Nagao et al explains how the control signal for the focusing system is acquired with the assistance of a prism placed in what is referred to as a critical angle in the beam path of the sub-beams that are being deflected or split from the sensing beam.

SUMMARY OF THE INVENTION

The object of the present invention is to create an optical system for guiding the read beam which system has an optimumly low number of optical elements, is a compact and has a low mass scanning unit to provide both the raw data signal as well as the control signals for the focusing and for the track following system. In particular, the aim is to place the imaging location of the corresponding rays of the reflected light as close together as possible in one plane so that favorable structures for the photo detector surfaces can be manufactured. Thus, the object of the present invention is to provide a more compact, and simplified system as compared to those known systems of the prior art.

These objects are obtained by an improvement in an optical system for guiding a read beam in a magneto-optical storage system, said optical system having means for creating a polarized read beam and directing it onto the storage medium which creates a reflected beam, a beam splitter being positioned in the path of the read beam for deflecting the reflected beam from the path of the read beam as a deflected beam, detector means for creating electrical signals from optical signals, first means connected to the detector means for creating a focusing control signal, second means connected to the detector means for creating a tracking control signal, third means for generating a raw data signal being connected to the detector means, and optical means for directing the deflected beam onto the detector means. The improvements comprise the optical means including a polarizer for creating two sub-beams from the deflected beam, said detector means having two detectors including a four-quadrant photo detector arrangement in a path of one of the two sub-beams, a second photo detector being arranged in the path of the other of the two sub-beams, said first means being connected to the four-quadrant detector with two quadrant pairs respectively being formed with the quadrants of each pair being diametrically opposite one another, the second means being connected to one of the first and second detectors for obtaining the output from symmetrical portions of the detector on each side of a projection of a tangent of the scan track, and the third means being connected to the first and second detectors with the intensity difference between the two sub-beams producing the raw data signal.

In the improved device, only a single beam splitter is used and this deflects the reflected laser beam out of the beam path of the scanning beam. The reflected laser beam is divided into two sub-beams by a polarizer and these two sub-beams are then directed onto image points of two common photo detector which are separated but lie topically close to one another. An astigmatic imaging system is employed in conjunction with a four-quadrant division of the one imaging point of the photo detector in order to acquire the focusing control signal for the focusing system in a known way. In this case, respectively two of the sub-areas of the imaging point which lie diametrically opposite one another are combined with respect to their electrical output signals and a difference signal that represents the focusing control signal for the focusing system is formed by subtraction between the two sub-sum signals that have thus occurred.

Another combination, namely by addition of all four output signals of the sub-areas of the four-quadrant detector, the same imaging point is used in order to form a further difference signal in combination with the electrical output of the second imaging point of the second detector and this further difference signal represents the raw data signal.

Finally, the four sub-areas of the four-quadrant detector can then be combined with one another in a third way in order to generate a tracking control signal for the track following system. In this case, the sub-areas of the four-quadrant detectors are combined in pairs with respect to their electrical output signals such that the two pairs lie symmetrically relative to a diagonal that coincides with the projection of the tangent of the read track on the storage disk. A third differential signal derived from these two pairs of sub-areas is combined in such a fashion to form the control signal for the track following system. By means of a corresponding division of the second imaging point or detector into two sections, this tracking control signal could also be acquired from the second sub-beam of the reflected laser beam.

The surface geometry of the photo detectors can be further advantageously used for the purpose of arranging the summing and subtraction circuits required for the formation of the different signals together with the light sensitive areas of the the photo detector in an integrated circuit which then forms the detector unit of the scanning system. Further signal-processing stages, for example, for signal shaping and/or filtering can even be incorporated into this electronic unit without this detector module, therefore, becoming excessively complex, large and heavy as a result of such integration. The invention thus, makes it possible to construct a simple and light weight scanning system, for example, a scanning system that is especially suitable for mechanical moved positioners.

Other objects and advantages will be readily apparent from the following description, the drawings and claims.

BRIEF DESCRIPTION OF THE DRAWINGS

FIG. 4-6 are schematic illustrations of a laser beam after passing through the astigmatic imaging system given different distances of the scanning image point on the storage disk from the optical system with FIG. 4 illustrating the correct distance; FIG. 5 illustrating a case where the storage disk is moved to close to the system; and FIG. 6 illustrating a case where the distance is too great between this scanning system and this storage disk;

DESCRIPTION OF THE PREFERRED EMBODIMENTS

The principles of the present invention are particularly useful when incorporated in an optical system for guiding a reading beam in a magneto-optical storage as illustrated by the block diagrams in FIG. 1. This system includes a laser diode 1 as a light source which diode will emit a linearly polarized laser beam. The divergent laser beam is focused by a positive lens 2 and as indicated with a broken lines in the beam path, this light ray is still elliptically deformed due to the properties of the laser diode 1. A prism 3, whose refractive edge is at a defined angle relationship to the beam course, is provided, so that, give a distortion in the plane of the drawing the light rays are reshaped into a light ray having a circular cross section. This light ray is supplied to a polarizer beam splitter 4 which is transmissive with respect to the beam direction of the incident, linearly polarized light rays. The light rays, which have passed through the beam splitter 4, are focused in a scan point on a surface of a storage disk 6 with the assistance of an objective lens 5.

The storage disk 6 is driven by a drive means not shown and rotates in a plane that is perpendicular to the plane of the drawing. It has a multitude on concentric recording tracks 61 of which only a few are shown schematically and not in the true scale. A characteristic of the magneto-optical storage is that the material whose magnetic properties are temperature-dependent are employed. Since neither questions a storage medium per se nor the nature of the writing process are of significance in the present case, it suffices to say that a laser beam with adequate intensity is focused onto the surface of the storage disk 6 when writing. The influencing time and intensity of the laser beam act together in order to locally heat the storage medium in those focal spots having the size of an adequate stable storage domain and the heating is to such degree that it becomes paramagnetic in this region. During cooling, a relative low magnetic field emitted by a schematically illustrated coil 7 then will act to locally define the magnetization directions. In accordance with the premise that the coercive field strength of the storage medium is significantly higher at room temperature than the field strength required for writing, the unheated regions of the storage disk cannot be remagnetized.

Of course, the laser beam must be radially positioned with respect to the individual tracks 61 of the storage disk 6 for the write and the read events and must be capable of being held to a selected track during operation of the storage arrangement. Further, it is also essentially significant in all optical storage that the laser light beam be kept in focus on the storage disk 6, for example, that a prescribed distance between the objective 5 and the surface of the storage disk 6 be maintained. Such positioning, track following and focusing systems for optical and in particular magneto-optical storages are known and are not shown in the block circuit diagram of FIG. 1 since they are of no significance in and of themselves to the present invention.

The present invention is directed to how the control signals for the track following system and for the focusing system are acquired from the read signals in addition to the actual data signals. How this is obtained shall be set forth hereinbelow. The Kerr or respectively the Faraday effect is exploited for reading a magneto-optical storage in accordance wherewith linearly polarized light is reflected at or passing through a layer having a priviledged magnetic direction experiencing a positive or respectively negative rotation of its polarization plane in accord with this direction.

During the read operation, the laser diode 1 is kept in continuous operation at low power and the laser light beam is again focused by the objective 5 onto the surface of the storage disk 6. The light, which has been reflected and rotated in its polarization plane in accordance with the local magnetization again passes through the objective 5 entering the beam splitter 4. The beam direction is now opposite that of the emitted laser beam and the light is now laterally deflected in the beam splitter 4. The reflected laser beam, which has been split out is applied to a polarizer 8 which can be fashioned as a Wollaston or Rochon prism. Both types of prisms have the property of splitting received light into two linearly polarized sub-beams having polarization planes perpendicular to one another. In the present case, both sub-beams are evaluated and are imaged onto two picture points topically offset relative to one another on a detector arrangement 11 by being focused through additional positive lens 9 in combination with the cylindrical lens 10.

The detector arrangement 11 is preferably fashioned as an integrated circuit comprising a photo detector having a specific geometry with individual detector areas which suitably combine with one another to allow raw data signals, the control signal for the track following and respectively a control signal for focusing system to be obtained.

In order to set forth this geometry of the photo detector 11 in greater detail, the acquisition of the raw data signals shall be considered in detail first. In order to simplify the explanation, it shall be assumed that the adjacent storage domains in a selected track of the storage disk 6 alternately exhibit positive magnetization in a sequence, i.e. neighboring storage domains represent the states or statuses of a "logical 0" and a "logical 1" respectively. In the chronological course, thus, the polarization plane of the reflected laser beam constantly skips by an angle 2 $\delta_0$, whereby $\delta_0$ is the rotational angle by which the linear polarized beam is rotated upon reflection at the storage medium.

In FIG. 2, a vector diagram, which qualitatively illustrates the beam splitter of the reflected laser beam in the polarizer 8, indicates the rotation of the direction of polarization. In order to establish the relationship to the block circuit diagram of FIG. 1, the plane of the drawing is arbitrarily assumed to be the plane x,y, whereas the x-direction coincides with the beam direction of the deflected, reflected laser beam following the beam splitter 4. The field strength vector of the linear polarized light then lies in a plane x,z perpendicular to this beam direction and shown in the vector diagram of FIG. 2. Two vectors $E_{\delta 1}$ and $E_{\delta 0}$ then lie symmetrical to the y-direction respectively rotated by the angle $\delta$ relative to the y-direction. Respectively one of these two vectors represents the field strength vector for one of the two states of the reflected laser beam preceding entry into the polarizer 8, and thus, represents either the status "logical 1" or "logical 0" of the respectively read storage region on the storage disk 6. On the basis of the above premise with respect to the recorded data sequence, a chronological mean value for the field strength vector, thus occurs and is referenced $E_0$ and lies in the y-direction.

Let it merely be pointed out here that considered strictly, the rotational angle $\delta$ shown in the vector diagram of FIG. 2 represents the rotational angle following the beam splitter 4. The rotational angle $\delta_0$ occurring as a result of the magneto-optical effect would be even smaller for the beam splitter also effects a widening of this rotational angle, this having a symmetrical influence here as effect intensification. Due to the qualitative illustration of the vector diagram in FIG. 2, let a quantitative example of currently available storage material also be provided here. The rotational angle $\delta_0$ due to the magneto-optical effect thereby amounts to about 0.25°, whereas the rotation then actually occurring following the polarization beam splitter 4 is to be set at about $\delta = 1°$.

A further coordinate system p1, p2 rotated by 45° in comparison to the coordinate system y,z is shown in the vector diagram of FIG. 2. This coordinate system represents the positioning of the mutually perpendicular polarization directions of the reflected laser beams split into a first and into a second sub-beam which is established due to the crystal structure of the polarizer 8. In other words, the field strength vector $E_{\delta 1}$ corresponding to this status "logical 1" is divided in the polarizer into two field strength components $E_{\delta 11}$ and $E_{\delta 12}$ which are perpendicular to one another and are respectively allocated to one of the two sub-beams output by the polarizer 8. The analogous case applies to the splitting of the field strength vector $E_{\delta 0}$ which is to be allocated to the status "logical 0". For reasons of clarity in the vector diagram, however, labels have not been provided for this vector.

It obviously follows from the symmetrical position of the coordinate system p1, p2 relative to the y-direction that the intensity i.e. the illumination intensity at the imaging points of the first and of the second sub-beams of the photo detector 11 under the above specific assumptions is identical and chronological average to a continuously changing data signal sequence. As may be read from the vector diagram of FIG. 2, this is effected by the 45° rotation of the polarizer 8 and this also being schematically illustrated in FIG. 1. When, however, the illumination intensity in the imaging points of the sub-beams is compared at a definite point in time, then a clear intensity difference dependent on the current polarization direction of the reflected laser beam can be seen. This intensity difference yields the raw data signal when evaluated as a difference signal. Viewed functionally, the position of the imaging points of the two sub-beams on the photo detector is initially meaningless with the restriction that the two imaging regions must exhibit a locally adequate spacing in order to be unequivocally detectable.

This becomes apparent in the evaluation of the reflected laser beam for the acquisition of the control signal for the focusing system. Together, the further positive lens 9 and the cylindrical lenses 10 form an astigmatic imaging system as know. This means that the overall light ray emanating from a subject point does not supply a uniform image point but rather image lines instead of image points occur at two discrete logical loci having different back focus distances.

Figure 3:
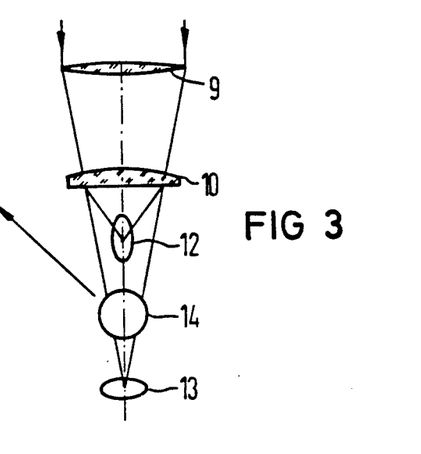
FIG. 3 is a schematic illustration illustrating the principles of the optical imaging of the astigmatic imaging system in the beam path of the reflected laser beam.

These known facts are schematically shown in FIG. 3. The further positive lens is thereby, again, referenced 9 and cylindrical lens is, again, referenced 10. In FIG. 3, then, the first image locus is referenced 12 and the second image locus is referenced 13. The astigmatic distortion supplies a respective image in the two image loci 12 and 13 in which a subject point is reproduced in the form of an ellipse. The major axis of the ellipse in the lens approximate locus 12, thereby, lies parallel to the directrix of the cylindrical lens and the major axis of the ellipse in the lens distal image locus 13 lies perpendicular thereto, as indicated with corresponding ellipses in FIG. 3. It can thereby be seen without further ado that transitional forms between one and the other image occurs at a location between the two image loci 12 and 13.

Figure 4:
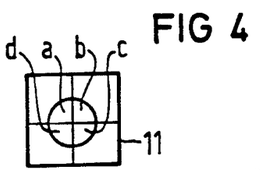

When it is then assumed that the subject lies exactly in the focus of the objective system 5 (not shown in FIG. 3), then the image locus 14 lying between the lens-proximate image locus 12 and the lens distal image locus 13 can be found in which both ellipse axes are the same size. Thus, the image of the subject point exactly yields a circle as schematically shown in FIG. 4. When the imaging plane 14 is then retained and it is a case wherein the subject point does not lie in the focus of the objective 5, then the circular image will again degenerates into an ellipse.

In the give application this behavior can then be utilized to acquire the control signal for a focusing system from the reflected laser beam. The photo detector 11 is arranged at the location of the middle imaging plane 14 and is arranged with respect to the astigmatic imaging system formed by the further positive lens 9 and the cylindrical lens 10, is that the scan spot of the surface of the storage disk 6 is imaged as a circular spot on the surface of the photo detector 11 when there is a correct distance between the storage disk 6 and the objective 5.

The illuminating circular area of the detector, as schematically shown in FIG. 4, is thereby subdivided into four individually acting quadrants a, b, c and d such that the projections of the tangent to the scanning track 61 on the storage medium 6 lies in the parting line between the sub-regions a, d on the one hand, and the sub-regions b, c on the other hand. Each of these sub-regions a-d should emit an individual electrical output signal. When the output signal of the subregions a and c and respectively regions b and d which lie opposite one another are then summed up in pairs and the two sums signals, thus obtained, are subtracted one from the other a differece signal is, thus, formed. The controls signal for the focusing system acquired in this way must have a value zero when the scanning laser beam is focused on the surface of the storage medium.

Figure 5:
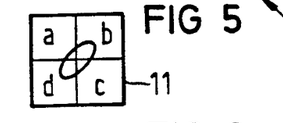
Figure 6:
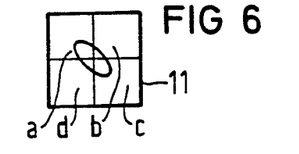

When the distance between the storage disk 6 and the objective 5 is too close, an ellipse, as schematically illustrated in FIG. 5, will occur. When this distance between the scan point of the storage medium 6 and the objective 5 is greater than the focal length of the objective, then an ellipse, such as illustrated in FIG. 6, will occur. It can be seen that the circular image degenerates into ellipses which are rotated with respect to one another. The analogly derived controls signal for the focusing system, thus, becomes unequal to zero and has an inverse operational signal with respect to the two instances shown in FIGS. 5 and 6. The operational signal, thus, contains the directional information and the absolute value of the control signal contains the distance information for a deviation of the storage medium 6 from the focus of the objective 5 with respect to this objective.

Figure 7:
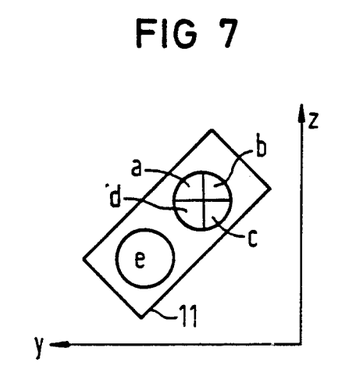
FIG. 7 shows a rotated position of the two photo detectors in the beam path of the reflected laser beam which corresponds to the image rotation.

One property of the astigmatic imaging system formed by the lenses 9 and 10 has hitherto been left out of consideration in this discussion. As shown in FIG. 3, the detector 11 is situated at the image locus 14. A more precise analysis of the imaging now shows that the tangent to this scan track 61 of the detector 11 appeared rotated by 90° in comparison to its position preceding the astigmatic imaging system. For the present application, the rotation of the cylindrical lens 10 corresponding to the rotation of the polarizer 8 should be additionally noted. All parameters for the geometry of the photo detector 11 have also been set forth. As shown in FIG. 7, the major axis of the detector 11 will proceed through two imaging spots of the two sub-beams of the polarizer 8 lie in the y,z plane rotated by 45° relative to the y-direction.

Figure 8:
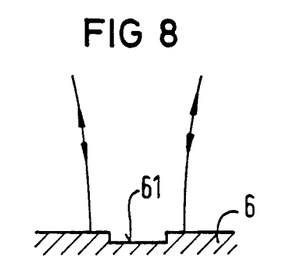
FIGS. 8 and 9 show a basic illustration of the scanning point of a storage track given different positions relative to the middle of the track with FIG. 8 showing the scan while properly tracking and FIG. 9 showing the scan when off set from the tracking.

The acquisition of the control signal for the track following system is still to be explained for this purpose, references made to FIGS. 8-11. In FIG. 8, a scanning laser beam which is aligned exactly to the track center of one of the scan tracks 61 of the storage disk 9 is schematically illustrated. This laser beam is reflected onto itself, it should also be noted that the track tangent resides perpendicular of the drawing in the symmetry line. Based on the above explanation, therefore, the luminous intensity of the photo detector 11 and its quadrants a and d and respectively b and c must meet this symmetry condition in so far as the focus condition for this storage disk 6 is observed. It follows therefrom that the control signal for the track following system or the tracking system is to be formed from a partial sum of the signals emitted form the sub-regions a and d and respectively b and c of the photo detector 11 and these partial sums are then subtracted from one another. The control signal thus has a zero value as long as the scanning laser beam lies exactly on the currently selected track 61 of the storage disk 6.

Figure 9:
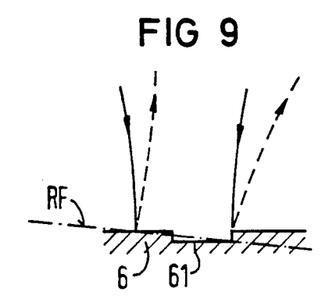

A deviation from a center tracking is illustrated in FIG. 9. The consequence of the track deviation of the scanning laser beam, which is shown in solid lines, can be qualitatively interpreted in the following way: the dimensions of the scanning point of the scanning laser beam on the surface of the storge disk 6 lies on the order of magnitude of the corresponding light wavelength λ of the laser light. Local variations of a surface structure from this dimension can therefore, not be handled without further ado based on the rules of geometric optics which are always based on the premise that the geometrical dimensions are large in comparison to the wavelength of the light.

In the present case, it is therefore, expedient and likewise justified to imagine the reflection area of the laser beam in the region of the track 61 as a planer surface which in a first approximation linearizes the step of the edge of the track 61. The reflection plane RF indicated with a dot dash line thus occurs as this reflection plane RF and is tilted by a small angle relative to the surface of the storage disk 6. As schematically illustrated in FIG. 9, the laser beam reflected at this imaginary reflection plane is therefore, rotated by a slight amount relative to the instant laser beam and it thus, imaged by the objective 5 as a parallel beam which is slightly offset parallel in comparison to the incident laser beam.

Figure 10:
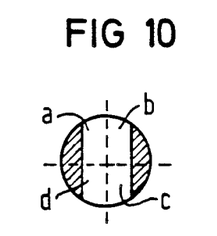
FIGS. 10 and 11 are a basic illustration of the illumination of the corresponding photo areas with different scanning cases with FIG. 10 showing when scanning is on track and FIG. 11 showing off track scanning such as illustrated in FIG. 9.
Figure 11:
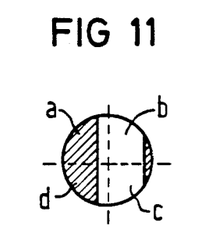

FIGS. 10 and 11 schematically show how this different reflection of the incident laser beam acts in the photo detector 11 given track centering or respectively track deviation. Both FIGS. again show the circular area of the photo detector 11 comprising the four quadrants a, b, c and d of FIG. 7 and the non-broken line parts indicate the profile of the reflected laser beam image onto the photo detector 11. FIG. 10 show a symmetrical imaging of the laser beam which occurs when the scanning laser beam is centered relative to the center of the track as shown in FIG. 8. In contrast thereto, FIG. 11 shows the asymmetrical imaging both in terms of the direction of the deviation as well as in terms of its size which will occur from the parallel offset of the reflected laser beam.

A simple solution for deriving the control signal for the track following system occurs with these geometrical relationships. This control signal can be formed as a difference signal from the partial sum of the signal outputs from the the quadrants a and d and from the two quadrants b and c respectively. In the case of the exact track centering, the two partial sum values are identical and the difference signal derived therefrom has a zero value. In contrast thereto, the control signal for the track following system is unequal to zero with a track deviation of the scanning laser beam so that an absolute value reflects the amount of the track deviation and this operational sign indicates the direction of the track deviation.

The described optical system thus meets all conditions of a scanning system for a magneto-optical storage so that both the raw data signal, as well as the control signals for both focusing and for the track following systems, can be acquired from the reflected laser beam without multiple beam splitting. This means not only a simplification in the optical beam path together with reduction in the number of optical elements required, but also means a further possibility for the design of the photo detector. Since, in this case, all photo detector surfaces for generating the various signals are arranged in one plane lying in close spatial proximity, the photo detector can be constructed as an integral circuit, and all electrical elements, which are necessary to obtain the above described combinations of the output signals of the individual photo detector areas, can also be incorporated into this integrated circuit. Further signal processing circuits such as, for example, pre-amplifiers and signal shaping stages can also be incorporated into such an integrated circuit with the mass and thus, the inertia of the optical scanning system can, therefore, be modified to a noteworthy degree. It thus becomes clear that the described optical system is especially suited for the employment in conjunction with a magneto-optical storage which should have a mechanically fashioned positioning unit and should nonetheless enable short access times.

Figure 12:
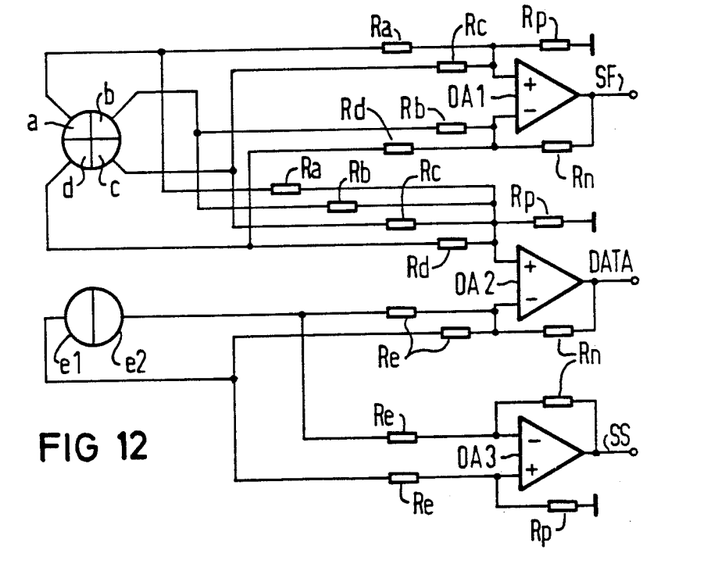
FIG. 12 is a block circuit diagram of a fundamental circuit of an integrated circuit which contains the photo detector with two imaging points and appertaining evaluation circuit for the acquisition of the raw data signals, the tracking control signal and the focusing control signal.

A block circuit diagram for the fundamental circuit of such an integrated circuit is shown in FIG. 12. For reasons of uniformity of illustration, the photo detector surfaces of the photo detector 11 are schematically shown therein with two circular areas analogous to FIG. 7 and are correspondingly references. However, differing from the illustrations of FIG. 7 and in accordance with a further embodiment of the invention, the second detector area e allocated to the second sub-beam of the reflected laser beam is shown as being divided into two sub-areas e1 and e2. This offers a possibility of acquiring the track following signal from the imaging of this second sub-beam, whereas the control signal for focusing system is derived from the imaging of the first sub-beam.

As illustrated, the circuit includes a first operational amplifier OA1, which has a positive and negative input. It is illustrated, the outputs from photo detector areas a and c of the four-quadrant first detector are connected in parallel through respective input resistors Ra and Rc to the positive input and are also connected to a common ground via common divider resistor Rp. In a similar manner, the two other photo detector areas b and d are connected in common to the negative input of the operational amplifier OA1 via corresponding input resistors Rb and Rd respectively and the negative input is also inversely fedback via a further resistor Rn. In this way, the first operational amplifier OA1 is wired as a multiple subtractor whereby its output voltage SF, which forms the control signal for the focusing system is derived from the relationship $$SF = \alpha(Ub + Ud) - \alpha(Ua + Uc)$$

wherein Ua, Ub, Uc and Ud are the signal voltage outputs at the corresponding photo detector segments or sectors a through d of the photo detector 11 and α is the gain prescribed by the respective resistance ratios between the input resistors Ra, Rb, Rc or Rd respectively and the inversely fedback resistor Rn or the divider resistor Rp respectively. For reasons of simplicity, it is also assumed for the above relationship that the input resistors Ra, Rb, Rc and Rd on the one hand and respectively the inverse fedback resistor Rn and the divider resistor Rp on the other hand are respectively of the same size.

The circuit includes a second operational amplifier OA2 whose output voltage DATA represents the raw data signal and is wired in a corresponding way. Here, the output signal of the four sub-areas a through d of the four-quadrant photo detector are supplied in parallel to the positive input and the output signal of the photo detector areas e1 and e2 are supplied to the negative input. Again, it is noted that the output from the four sub-surfaces a through d are supplied in lines having resistors Ra through Rd respectively and the output of the two areas e1 and e2 are two lines having resistors Re. The second operational amplifier OA2, thus, forms a difference signal from the sub-sum signals respectivley supplied to one of the amplifier inputs.

The difference in the luminous intensity on the subareas e1 and e2 is evaluated in the same way with a third operational amplifier OA3. An output signal SS of the amplifier OA3 will represent the control signal for the track following system.

The described circuit is only one possible embodiment of the integrated circuit. Of course, other known summing and subtraction circuits could also be implemented and as indicated above, it would also be conceivable to incorporate additional signal processing, electronic assemblies for signal shaping and filtering into the integrated circuit.

The described exemplary embodiment should not limit the concept of the present invention for a number of modifications are conceivable. Thus, for example, it would be possible without further ado with respect to the guidance of the light beam to transpose the sequence of the polarizer 8 and the astigmatic imaging system 9 and 10 without this denoting an essential functioning modification. Over and above this, let it be pointed out that the elements, which are needed overall for the guidance of the laser beam, are only shown by way of an example and are also shown simplified for reasons of clarity. In a practical structure, for example, an attempt would be made to place the essential optical path length in a plane parallel to the storage disk 6. This means, for example, that a deflection mirror would be situated between the beam splitter 4 and the objective 5. The described optical system can moreover be arranged in different angular attitude relative to the tangent of the recording track 61 and a different geometric arrangement for the photo detector 11 with respect to the principle beam direction would thus also have to be taken into consideration.

What is perserved in all of these embodiments is the principle that the two control signals for the focusing and, respectively, for the track following system are also decoupled in the first order when as set forth in the first exemplary embodiment both control signals are derived from one and the same imaging of one of the two sub-beams. For it can be easily seen that no apparent focus error can occur even given a track deviation but a correct focus or inversely that no apparent track error can be indicated given a focus error but a faultless track centering.

Although various minor modifications may be suggested by those versed in the art, it should be understood that I wish to embody within the scope of the patent granted hereon, all such modifications as reasonably and properly come within the scope of my contribution to the art.

I claim:

1. In an optical system for guiding a read beam in a magneto-optical storage system, said optical system having means for creating a polarized read beam and directing it onto a scanning track of a storage medium which creates a reflected beam, a beam splitter being positioned in the path of the read beam for deflecting the reflected beam from the path of the read beam as a deflected beam, detector means for creating electrical signals from optical signals, first means connected to the detector means for creating a focusing control signal, second means connected to the detector means for creating a tracking control signal, third means for generating a raw data signal being connected to the detector means, and an optical means for directing the deflected beam onto the detector means, the improvements comprising said optical system only directing a single beam at the storage system and having only a single beam splitter to create a single deflected beam, the optical means including a polarizer for creating two sub-beams from the single deflected beam, said detector means having two detectors including a four-quadrant detector arrangement in the path of one of the two sub-beams and a second detector being arranged in the path of the other of the two sub-beams, said first means being connected to the four-quadrant detector with two-quadrant pairs respectively being formed with the quadrants of each pair being diametrically opposite one another, the second means being connected to one of the two detectors for obtaining the output from symmetrical portions of the detector on each side of a projection of a tangent of the scanning track, and the third means being connected to the two detectors with the intensity differences between the two sub-beams producing the raw data signal.

2. In an optical system according to claim 1, wherein the four-quadrant detector arrangement is oriented with respect to the one sub-beam with one of its diagonals which forms a sector boundary coinciding with a projection of the tangent of the scanning track on the photo detector and said second means being connected to the four-quadrant detector so that the sum of the two quadrants on one side of the diagonal and the sum of the two quadrants on the other side of the diagonal provide a difference to indicate the tracking control signal.

3. In an optical system according to claim 2, wherein the photo detector arrangement forms a part of an integrated circuit which simultaneously contains both a circuit unit for the acquisition of the raw data signal as well as circuit units for the acquisition of the focusing control signal and for the tracking control signal.

4. In an optical system according to claim 1, wherein the four-quadrant detector is used for the derivation of the focusing control signal from the one sub-beam, the second detector surface is employed for the determining of the tracking control signal, said second detector being sub-divided into two sub-areas which lies asymmetrically on both sides of a projection of the tangent of the scanning track.

5. In an optical system according to claim 4, wherein the two photo detector arrangements form part of an integrated circuit which includes both a circuit unit for the acquisition of a raw data signal from the two detectors as well as circuit units for the first means for creating the focusing control means and a circuit unit for the second means for creating the tracking control said signal.

6. In an optical system according to claim 1, wherein the two photo detectors form part of an integrated circuit which simultaneously includes circuit units for the first means, for the second means, and for the third means.

7. In an optical system according to claim 1, wherein the polarizer is arranged in the path of the deflected beam between the beam splitter and the astigmatic imaging system.

8. In an optical system according to claim 7, wherein the four-quadrant detector arrangement is oriented with respect to a projection of the tangent of the scanning track onto the photo detector so that the second means for creating the tracking signal sums the two quadrants on one side of the diagonal and the two quadrants on the other side of the diagonal and takes the difference to determine the tracking control signal.

9. In an optical system according to claim 8, wherein the two detectors are formed as a part of an integrated circuit which also includes circuit units for each of the first means, the second means and the third means.

10. In an optical system according to claim 7, wherein the detectors and circuits for the first, second and third means are formed in an integrated circuit.

11. In an optical system according to claim 7, wherein the second detector has two sub-areas arranged on opposite sides of a projection of a tangent of the scanning track, said two sections being connected to the second means for determining the tracking control signal.

12. In an optical system according to claim 11, wherein the two detectors, and circuits for the first, second and third means are all formed in an integrated circuit arrangement.

13. In an optical system according to claim 1, wherein the polarizer is arranged in the deflected beam path following the astigmatic imaging system and before the two detectors.

14. In an optical system according to claim 13, wherein the four-quadrant detector is oriented with respect to the subbeam with a diagonal being on a projection of a tangent of the scanning track and said second means is connected to the two quadrant detectors on one side of said diagonal and to two quadrants on the other side of the diagonal to obtain the tracking control signal therefrom.

15. In an optical system according to claim 14, wherein the two detectors and circuits for the first means, the second means and third means are all formed in an integrated circuit.

16. In an optical system according to claim 13, wherein the second detector has two sub-portions arranged symmetrically relative to a projection of a tangent of the scan track, said two sub-portions being connected to the second means and used for determining the tracking control signal.

17. In an optical system according to claim 16, wherein the two detectors, and circuits for the first means, for the second means and for the third means are all formed in a single integrated circuit arrangement.

* * * * *